US010126408B2

(12) United States Patent
Ise (10) Patent No.: US 10,126,408 B2
(45) Date of Patent: Nov. 13, 2018

(54) METHOD AND DEVICE FOR DISPLAYING SHIP VICINITY INFORMATION

(71) Applicant: Furuno Electric Co., Ltd., Nishinomiya (JP)

(72) Inventor: Takeshi Ise, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 449 days.

(21) Appl. No.: 14/849,492

(22) Filed: Sep. 9, 2015

(65) Prior Publication Data

US 2016/0069987 A1    Mar. 10, 2016

(30) Foreign Application Priority Data

Sep. 10, 2014  (JP) .................................. 2014-183862

(51) Int. Cl.
    *G01C 21/00*    (2006.01)
    *G01S 7/12*    (2006.01)
    *G01S 7/22*    (2006.01)
    *G01S 13/86*    (2006.01)
    *G01S 13/93*    (2006.01)

(52) U.S. Cl.
    CPC ...... *G01S 7/12* (2013.01); *G01S 7/22* (2013.01); *G01S 13/86* (2013.01); *G01S 13/9307* (2013.01)

(58) Field of Classification Search
    CPC . B60R 22/20; B60R 22/03; B60R 2022/1806; A44B 11/2503
    See application file for complete search history.

(56) References Cited

U.S. PATENT DOCUMENTS

| | | | | |
|---|---|---|---|---|
| 5,210,534 A | * | 5/1993 | Janex | G08G 3/02 340/961 |
| 5,432,515 A | * | 7/1995 | O'Conner | G01S 7/003 340/984 |
| 6,707,414 B2 | * | 3/2004 | Van Rees | G01S 7/04 342/23 |
| 7,496,434 B2 | * | 2/2009 | Fossen | G05B 23/0256 701/21 |

(Continued)

FOREIGN PATENT DOCUMENTS

JP    2002154475 A    5/2002

OTHER PUBLICATIONS

Shiotani, S., "On Comparison of Estimation Methods of Ship Waves," The Journal of Japan Institute of Navigation issued by Japan Institution of Navigation, vol. 106, Mar. 25, 2012, 7 pages.

*Primary Examiner* — Ian Jen
(74) *Attorney, Agent, or Firm* — Alleman Hall Creasman & Tuttle LLP (57) ABSTRACT

A ship vicinity information display device is provided. The ship vicinity information display device includes a display unit configured to display information indicating a situation in the vicinity of a first ship, a detector configured to detect a second ship existing in the vicinity of the first ship, a ship wave information generating module configured to generate information of ship waves caused by the second ship, and a display processing module configured to cause the display unit to graphically display the second ship detected by the detector, and the information of the ship waves generated by the ship wave information generating module.

11 Claims, 3 Drawing Sheets

(56) References Cited

U.S. PATENT DOCUMENTS

| | | | |
|---|---|---|---|
| 9,081,098 B2* | 7/2015 | Misonoo | G01S 7/52004 |
| 9,121,956 B2* | 9/2015 | Flynn | G01V 1/3808 |
| 9,783,199 B2* | 10/2017 | Martin | B60W 30/18027 |
| 2004/0003958 A1* | 1/2004 | Fujimoto | G01S 7/6218 |
| | | | 181/124 |
| 2006/0058929 A1* | 3/2006 | Fossen | G05B 23/0256 |
| | | | 701/21 |
| 2009/0079590 A1* | 3/2009 | Hiraoka | B63B 49/00 |
| | | | 340/984 |
| 2010/0214151 A1* | 8/2010 | Kojima | G01S 7/414 |
| | | | 342/28 |
| 2011/0063163 A1* | 3/2011 | Kojima | G01S 7/066 |
| | | | 342/179 |
| 2013/0271309 A1* | 10/2013 | Kaida | G01S 7/10 |
| | | | 342/41 |
| 2014/0306997 A1* | 10/2014 | Kubota | G06T 11/60 |
| | | | 345/634 |
| 2014/0313212 A1* | 10/2014 | Asahara | G06T 1/60 |
| | | | 345/531 |
| 2015/0089427 A1* | 3/2015 | Akuzawa | G05D 1/0206 |
| | | | 715/771 |

* cited by examiner

METHOD AND DEVICE FOR DISPLAYING SHIP VICINITY INFORMATION

CROSS-REFERENCE TO RELATED APPLICATION(S)

This application claims priority under 35 U.S.C. § 119 to Japanese Patent Application No. 2014-183862, which was filed on Sep. 10, 2014, the entire disclosure of which is hereby incorporated by reference.

TECHNICAL FIELD

This disclosure generally relates to a ship vicinity information display device, which displays information indicating a situation in the vicinity of a ship on a display unit.

BACKGROUND OF THE INVENTION

It has been pointed out that ship waves which are waves caused by ships traveling may cause marine accidents, such as capsizing of small ships or damage on moored ships. Recently, due to the increase in maximum speed of ships, the number of ships traveling while generating large ship waves increased, which makes it easier to cause dangerous ship waves.

Regarding such ship waves, various studies have been conducted, of which results include a method of estimatedly calculating ship waves disclosed in "Comparison in Estimated Calculation Method for Ship Waves" by Shigeaki Shiotani in The Journal of Japan Institute of Navigation issued by Japan Institution of Navigation Vol. 106, pp. 271-277. Moreover, to prevent marine accidents caused by the ship waves, Japan Coast Guard regulates marine traffic.

JP2002-154475A discloses a configuration for general merchant ships having a square stern (transom stern), in which wave resistance is suppressed by forming the stern into a specific shape. Generation of stern waves is suppressed by this method, and therefore generation of ship waves can also be suppressed.

However, in a case where ship waves which influence on a small ship occur therearound, it is difficult for the small ship to acquire information of the ship waves before the ship waves reach the small ship, and thus, it is difficult to avoid the influence of the ship waves.

SUMMARY OF THE INVENTION

The purpose of this disclosure relates to providing a ship vicinity information display device, which is able to graphically display ship waves on a display unit.

According to a first aspect of this disclosure, a ship vicinity information display device with the following configuration is provided. Specifically, the ship vicinity information display device includes a display unit configured to display information indicating a situation in the vicinity of a first ship, a detector configured to detect a second ship existing in the vicinity of the first ship, a ship wave information generating module configured to generate information of ship waves caused by the second ship, and a display processing module configured to cause the display unit to graphically display the second ship detected by the detector, and the information of the ship waves generated by the ship wave information generating module.

Thereby, since the information of the ship waves is graphically displayed on the display unit, a user can instinctively acknowledge the existence of the ship waves, and the influence of the ship waves becomes easier to be avoided. Moreover, by generating the information of ship waves caused by the second ship with the ship wave information generating module, the information of the ship waves caused in the vicinity of the first ship can be expressed accurately on the display unit.

The display processing module preferably draws the second ship and the information of the ship waves, the information of the ship waves drawn as a pair of lines spreading away from each other in a rearward direction of the second ship.

Thereby, a simple display mode for the ship waves can be achieved, and therefore, a display screen of the display unit can be prevented from becoming messy by contents scattered around.

The ship wave information generating module preferably generates the information of the ship waves by a calculation based on at least one of a moving speed, draft and size of the second ship.

Thereby, the information of the ship waves which changes drastically by the moving speed, draft, size and the like of the second ship, can accurately be generated.

The ship wave information generating module preferably generates the information of the ship waves based on information received from the second ship.

Thereby, the information of the ship waves can be acquired from the second ship, and the generation of the information of the ship waves in a wide range can be achieved. Thus, the user can grasp the ship waves promptly and make a suitable action.

The ship wave information generating module preferably generates the information of the ship waves based on information detected by an instrument provided in the first ship.

In this case, even if the information cannot be acquired from the second ship, the information of the ship waves can be displayed on the display unit by using the information acquired directly on the first ship side.

The ship vicinity information display device preferably has the following configuration. Specifically, the ship vicinity information display device further includes a risk evaluating module configured to evaluate a risk of encountering the ship waves at least based on the information of the ship waves. The display processing module displays the risk on the display unit.

Thereby, since the risk is displayed on the display unit, the user can determine the ship waves to which the user needs to pay attention based on the risk.

The ship vicinity information display device preferably further includes an alarm unit configured to issue an alarm when the risk of encountering at least one of the ship waves is evaluated as high by the risk evaluating module.

Thereby, when the risk of encountering the ship waves is high, the user can be alerted by the alarm.

The display processing module preferably displays a change of the information of the ship waves over time on the display unit in real time.

Thereby, the change of the information of the ship waves caused by an acceleration of the second ship, fading out over time, etc., is suitably updated and displayed on the display unit. Thus, the user can constantly grasp the situation of the ship waves in the vicinity of the first ship and make a suitable action.

The ship vicinity information display device preferably further includes a ship wave countermeasure indicating module configured to indicate a countermeasure against the ship waves based on the information of the ship waves.

Thereby, the user can make a suitable action against the ship waves by referring to the countermeasure indicated by the ship wave countermeasure indicating module.

The ship vicinity information display device preferably further includes a first-ship wave information transmitter configured to transmit, to a second ship, information of ship waves caused by the first ship.

Thereby, since the information of the ship waves caused by the first ship can be transmitted to the second ship before the ship waves cause influence on the second ship, the second ship becomes easier to avoid the influence of the ship waves caused by the first ship.

According to a second aspect of this disclosure, a method of displaying ship vicinity information is provided. Specifically, the method includes detecting, from the vicinity of a first ship, a second ship, generating information of ship waves caused by the second ship, and causing a display device to graphically display the second ship and the information of the ship waves, the display device configured to display information indicating a situation in the vicinity of the first ship.

Thereby, since the information of the ship waves is displayed graphically on the display device, the user can instinctively acknowledge the existence of the ship waves, and the influence of the ship waves becomes easier to be avoided. Moreover, by generating the information of the ship waves caused by the second ship, the information of the ship waves caused in the vicinity of the first ship can be expressed accurately on the display device.

BRIEF DESCRIPTION OF THE DRAWING(S)

The present disclosure is illustrated by way of example and not by way of limitation in the figures of the accompanying drawings, in which the like reference numerals indicate like elements and in which.

DETAILED DESCRIPTION

Figure 1:
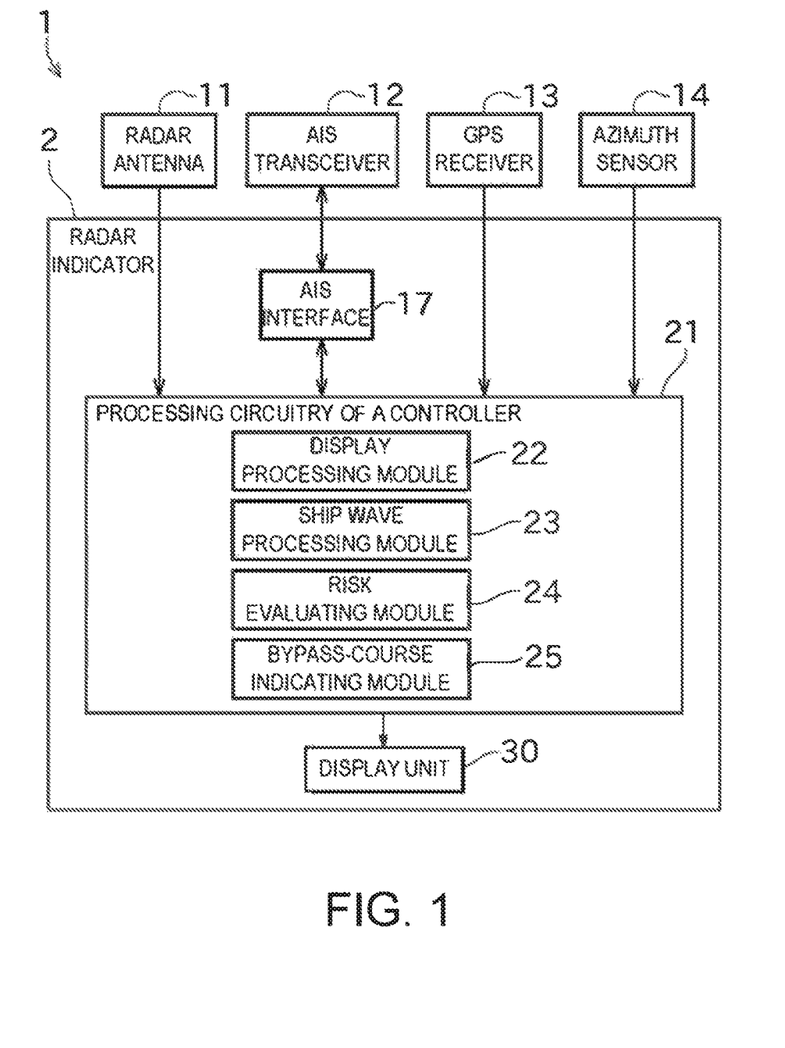
FIG. 1 is a block diagram illustrating an overall configuration of a radar apparatus including a radar indicator according to one embodiment of this disclosure.
Figure 2:
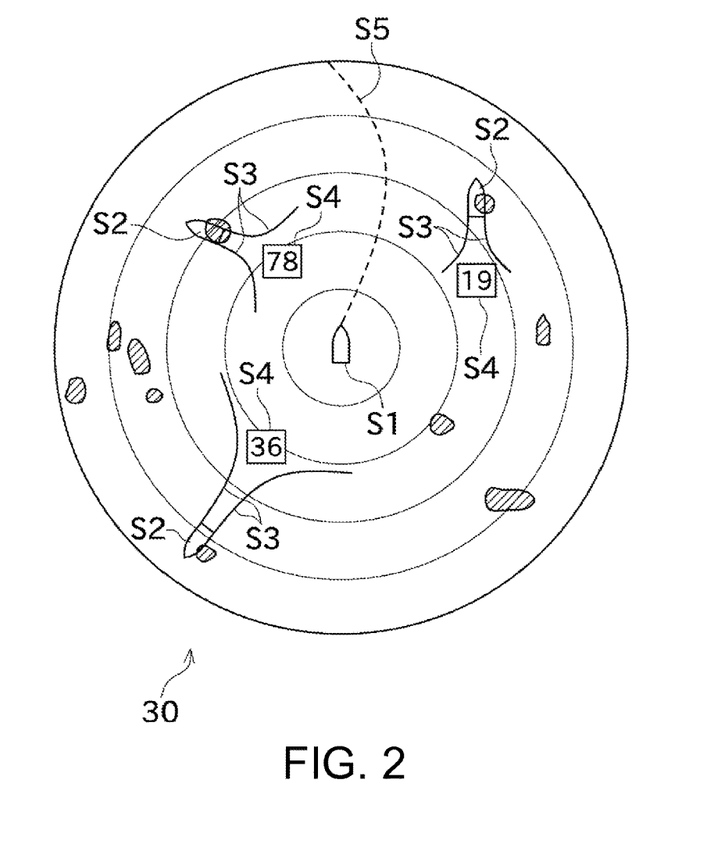
FIG. 2 is a view illustrating one example of a display screen of a display unit of the radar indicator.

Next, one embodiment of this disclosure is described with reference to the appended drawings. FIG. 1 is a block diagram illustrating an overall configuration of a radar apparatus 1 including a radar indicator 2 according to one embodiment of this disclosure. FIG. 2 is a view illustrating one example of a display screen of a display unit 30 of the radar indicator 2.

As illustrated in FIG. 1, the radar apparatus 1 includes the radar indicator 2 of this embodiment (ship vicinity information display device). The radar apparatus 1 of this embodiment also includes a radar antenna 11, an AIS transceiver 12, a GPS receiver 13, and an azimuth sensor 14, and is installed in a ship (hereinafter, may be referred to as "the ship concerned," "first ship").

The radar antenna 11 transmits a pulse-shaped radio wave with strong directivity, and receives a reflection wave (radar echo) caused by the pulse-shaped radio wave reflecting on a target object and returned. Further, the radar antenna 11 repeats the transception of the radio wave while rotating on the horizontal plane. With this configuration, the radar apparatus 11 of this embodiment rotates 360° on the horizontal plane and scans the vicinity of the first ship. The result of scanning by the radar antenna 11 (information of radar echoes) is outputted to the radar indicator 2.

The AIS transceiver 12 of this embodiment receives, via an Automatic Identification System (AIS) antenna (not illustrated), AIS information transmitted from AISs installed in other ships (hereinafter, may be referred to as the "second ships," respectively). The AIS information is information of each of the second ships including the name, length, width, current position, course over ground, ground speed, heading, rudder angular speed, traveling state, draft, cargo, and destination. The AIS information received from the second ship by the AIS transceiver 12 is outputted to the radar indicator 2. The AIS transceiver 12 of this embodiment also transmits AIS information of the first ship itself from the AIS antenna to the second ship. The AIS information of the first ship includes similar kinds of information to that of the second ship.

The GPS receiver 13 receives GPS signals from GPS satellites and performs positioning to acquire information regarding a position of the first ship. The information of the position of the first ship acquired by the GPS receiver 13 is outputted to the radar indicator 2.

The azimuth sensor 14 acquires the heading of the first ship. Specific examples of the azimuth sensor 14 include a gyrocompass. The information of the heading of the first ship acquired by the azimuth sensor 14 is outputted to the radar indicator 2.

The radar indicator 2 includes an AIS interface 17 (detector), a controller 21, and a display unit 30 (alarm unit).

The AIS interface 17 is configured as an external interface (e.g., connector) of the radar indicator 2. The AIS interface 17 fetches into the radar indicator 2 the AIS information received via the AIS transceiver 12 from a second ship which is located in the vicinity of the first ship, and the AIS interface 17 transfers an instruction from the radar indicator 2 to the AIS transceiver 12. Thus, the AIS interface 17 has a function to detect second ships located in the vicinity of the first ship.

The controller 21, although not illustrated, is configured as a computer comprised of a CPU as an operation unit, and a ROM and a RAM as memories. The ROM stores a display control program to cause the display unit 30 to display a radar image, ship waves, etc. Further, these hardware and software cooperate with each other to cause the controller 21 to operate as a display processing module 22, a ship wave processing module 23 (ship wave information generating module), a risk evaluating module 24, a bypass-course indicating module 25 (ship wave countermeasure indicating module), etc. Note that, the specific configuration of the controller 21 is described later.

The display unit 30 of this embodiment is configured as a liquid crystal display which is able to perform color display. The display unit 30 of this embodiment displays the radar image created by the controller 21.

Next, the controller 21 of the radar indicator 2 is described in detail.

The controller 21 analyzes the information of the radar echoes acquired from the radar antenna 11, and creates the radar image indicating the situation in the vicinity of the first ship. Moreover, the controller 21 calculates the position, course over ground, ground speed, etc. of the first ship based on the GPS information acquired from the GPS receiver 13, and calculates the heading and rudder angular speed of the first ship based on the azimuth information acquired from the azimuth sensor 14.

As described above, the controller 21 includes the display processing module 22, the ship wave processing module 23, the risk evaluating module 24, and the bypass-course indicating module 25.

The display processing module 22 causes the display unit 30 to display the created radar image. Moreover, the display processing module 22 of this embodiment displays a symbol of the second ship, the ship waves of the second ship, a risk of encountering at least one of the ship waves, and/or a course for avoiding the ship waves, in a manner that they are superimposed on the radar image.

The ship wave processing module 23 generates ship wave data containing the information of the ship waves caused as the second ship travels. The ship wave data may contain heights, propagating directions and propagating speeds of the ship waves; however, it is not limited to this. The ship wave data is generated through an estimation of the ship waves performed by the ship wave processing module 23 based on the position, speed, size, draft, etc. of the second ship which are detected by the controller 21 based on the AIS information. Specific examples of the method of estimating the ship waves include a method of calculating by using a well-known linear wave theory, and a method of calculating based on data obtained from experiment in advance.

Generally, the heights and propagation speeds of the ship waves increase as the ship accelerates, and the cycle of the ship waves becomes longer as the ship accelerates. Also, it is known that the heights and the like of the ship waves to be generated depend on the length, width, and draft of the ship. The ship wave data is preferably generated by taking into at least to some level of consideration of the above-described characteristics that are seen when the ship waves are generated. Therefore, in this embodiment, the ship wave processing module 23 estimates the ship waves based on the speed, draft, size and the like of the second ship.

The ship wave processing module 23 displays the estimated ship waves such that they are superimposed on the radar image by the display processing module 22. Thus, the ship waves are graphically displayed on the display screen of the display unit 30.

The risk evaluating module 24 evaluates dangerousness (risk) for the first ship to encounter at least one of the ship waves (hereinafter, suitably referred to as the "ship wave concerned") based on the information (wave heights, etc.) contained in the ship wave data generated by the ship wave processing module 23. Hereinafter, the risk of encountering the ship wave concerned evaluated by the risk evaluating module 24 may be referred to as the ship wave risk. Although various evaluation criteria of the risk evaluating module 24 may be considered, generally, the risk is preferably evaluated higher in cases such as the heights of the ship waves are great, the propagation speeds are high, or the ship wave concerned is generated near the first ship. Further, since the speed of the first ship and an angle of the first ship with respect to the ship wave concerned when they encounter each other greatly influence the rocking of the first ship, the information of the moving speed and/or the heading of the first ship may be included in the evaluation criteria for the ship wave risk. In this case, situations where the first ship extremely easily receives the influence from the ship wave concerned (e.g., a case where the first ship obliquely moves into the ship wave concerned at a high speed, a case where the ship wave concerned moves as a transverse wave to the first ship) can be taken into consideration for the risk evaluation.

Further, the risk evaluating module 24 causes the display processing module 22 to display the ship wave risk on the display unit 30. Thus, the user can determine a level of attention required for the first ship against the ship wave concerned, based on the displayed risk.

Moreover, when ship waves with high risk exist in the vicinity of the first ship, the risk evaluating module 24 notifies this situation to the user to be cautious (alerts the user) about the ship waves. Hereinafter, the ship waves with high risk may comprehensively be referred to as the high risk ship wave. As a method of alerting the user through the display unit 30, the ship wave risk displayed on the display unit 30 may be displayed to blink, the displayed ship wave risk may be enlarged, or the display color of the ship waves or the ship wave risk may be changed. Alternatively/in addition to visually alerting through the display unit 30, the risk may be alerted aurally, for example by a buzzer. In this manner, when the high risk ship wave is detected, the alarm is issued automatically, and therefore, it can be prevented that the user overlooks the high risk ship wave.

For example, when the high risk ship wave described above is detected, the bypass-course indicating module 25 calculates a course on which the influence of the ship wave can sufficiently be avoided, based on the ship waves estimated by the ship wave processing module 23, and the ship wave risk evaluated by the risk evaluating module 24. Applying the calculated course (hereinafter, may be referred to as the "bypass course") is an example of countermeasures against the ship waves.

The bypass-course indicating module 25 indicates the bypass course to the user by causing the display processing module 22 to display the bypass course on the display unit 30. The user can take the displayed bypass course into consideration for determining a course that the first ship preferably takes.

FIG. 2 illustrates an example of the radar image displayed on the display unit 30. In FIG. 2, the controller 21 (display processing module 22) causes the display unit 30 to display a first-ship symbol (the current position of the first ship) S1 and second-ship symbols (the current positions of the second ships) S2 based on the information acquired from the radar antenna 11, the AIS transceiver 12, the GPS receiver 13, and the azimuth sensor 14.

In the radar image of this embodiment, the first-ship symbol S1 is drawn at the center such that the heading of the first ship is oriented upward. Each second-ship symbol S2 is drawn at a position corresponding to the current position of the second ship with respect to the first ship. Note that, the current position of the second ship means a relative position to the first ship, calculated based on the position of the first ship, the heading of the first ship, and the position of the second ship. Further, the second-ship symbol S2 is drawn to be oriented in a direction corresponding to the heading of the second ship.

A ship wave S3 is graphically drawn rearward in the oriented direction of the second-ship symbol S2 by the display processing module 22. In this embodiment, the ship wave S3 is displayed on the display unit 30 as a single pair of symmetric curve lines spreading away from each other in the rearward direction of the second-ship symbol S2. Note that, one ship wave S3 indicates a pair of the ship waves in this embodiment. Thus, a simple display mode in which the longitudinal waves (Kelvin waves) constituting the ship waves can be illustrated in a manner that is easy to understand can be achieved, and the display screen can be prevented from becoming messy by contents scattered around.

A ship wave risk S4 is displayed near each ship wave S3 so that the user can easily grasp the relation with the corresponding ship wave S3. In this embodiment, the ship wave risk is displayed as a number from 1 to 100; however, various display modes, such as the ship wave risk is expressed in about five grades and the color of the ship waves is changed according to the grade, may be considered. Moreover, the ship wave risk may be evaluated for each of the ship waves and the color may be changed for each of the ship waves.

A bypass course S5 is drawn as a dashed line extending from the first-ship symbol S1. In the example of FIG. 2, to avoid influence of the ship wave concerned of the second ship that is located leftward in front of the first ship, a route diverting the first ship rightward is indicated as the bypass course S5.

With the above configuration, by checking the ship wave S3 displayed on the display unit 30, the user can grasp the ship waves before the ship wave concerned caused by the second ship reaches the first ship, and can easily make an action thereagainst. Further, the level of attention to the ship waves can suitably be determined by the displayed ship wave risk S4. Moreover, the user can easily determine a course of the first ship for avoiding the ship waves by referring to the displayed bypass course S5.

Note that, in the radar indicator 2 of this embodiment, the controller 21 may acquire in real time the various information from the radar antenna 11, the AIS transceiver 12, the GPS receiver 13, and the azimuth sensor 14, generate the radar image in real time and cause the display unit 30 to display it. Further, the processing at the display processing module 22, the ship wave processing module 23, the risk evaluating module 24, and the bypass-course indicating module 25 in the controller 21 is also performed in real time. Thus, even if the ship waves change over time, for example, by becoming larger due to acceleration of the second ship or by fading out, since the change is immediately reflected on the display screen of the display unit 30, the user can constantly grasp the situation of the ship waves in the vicinity of the first ship and make a suitable action.

Note that, the radar indicator 2 described above causes the display unit 30 to display the ship wave S3 so that the user can make a suitable action against the ship waves caused by the second ship. However, there is a possibility that the second ship may receive the influence of the ship waves caused by the first ship on the contrary. In consideration of this, the radar indicator 2 may include a first-ship wave information transmitter (not illustrated) configured to transmit, to the second ship, information regarding the ship waves caused by the first ship (including information for alerting about the ship waves). Further, the ship waves caused by the first ship can be estimated similarly to the estimation of the ship waves caused by the second ship, based on the AIS information transmitted from the first ship. Thus, the second ship can be prompted to make a suitable action before the ship wave concerned of the first ship causes influence on the second ship, and therefore, it becomes easier for the second ship to avoid the influence of the ship wave concerned.

As described above, the radar indicator 2 of this embodiment includes the AIS interface 17, the display unit 30, the ship wave processing module 23, and the display processing module 22. The AIS interface 17 detects the second ship located in the vicinity of the first ship. The display unit 30 displays the information indicating the situation in the vicinity of the first ship. The ship wave processing module 23 generates the information of the ship waves caused by the second ship. The display processing module 22 causes the display unit 30 to graphically display the second ship detected by the AIS interface 17, and the ship wave S3 based on the information of the ship waves generated by the ship wave processing module 23. Further, the graphic shape of the ship wave S3 displayed on the display unit 30 includes the pair of lines spreading away from each other in the rearward direction of the second ship (second-ship symbol S2).

Since the ship wave S3 is graphically displayed on the display unit 30 as above, the user can instinctively acknowledge the existence of the ship waves, and the influence of the ship waves becomes easier to be avoided. Moreover, since the ship wave processing module 23 generates the information of the ship waves caused by the second ship, the information of the ship waves caused in the vicinity of the first ship can be expressed accurately on the display unit 30. Furthermore, since a simple display mode for the ship wave S3 can be achieved, the display screen of the display unit 30 can be prevented from becoming messy by contents scattered around.

Next, modifications in displaying the ship wave S3 are described with reference to FIGS. 3 to 6. Note that, in the following description of the modifications, the components same as/similar to the ones in the embodiment described above are denoted with the same reference numerals as those in the embodiment described above, and the description thereof may be omitted.

Figure 3:
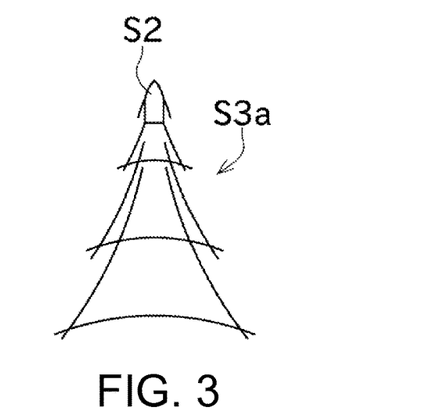
FIG. 3 is a view illustrating a display mode of ship waves in a first modification.

A ship wave S3a of the first modification illustrated in FIG. 3 is displayed with a shape closer to actual ship waves, compared to the embodiment described above (FIG. 2). In the graphic shape indicating the ship wave S3a, the longitudinal waves are indicated by a plurality of pairs (three pairs) of curve lines drawn such that the lines of each pair spread away from each other in the rearward direction of the second ship, and the transverse waves are indicated by three curve lines substantially perpendicular to the oriented direction.

Figure 4:
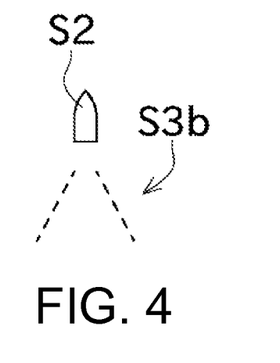
FIG. 4 is a view illustrating a display mode of the ship waves in a second modification.

A ship wave S3b of the second modification illustrated in FIG. 4 is expressed in a simple manner, by a single pair of straight lines (dashed lines). The single pair of straight lines are drawn to spread away from each other in the rearward direction of the second ship. Further, the ship wave S3b is displayed slightly separated from the second-ship symbol S2.

Figure 5:
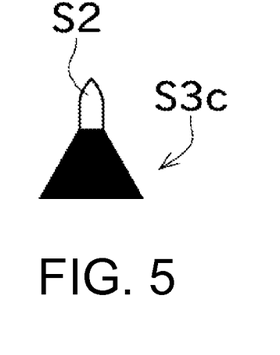
FIG. 5 is a view illustrating a display mode of the ship waves in a third modification.

A ship wave S3c of the third modification illustrated in FIG. 5 is expressed as a trapezoid area drawn rearward in the oriented direction of the second ship from the second ship. The outline of the trapezoid area includes a pair of straight lines drawn to spread away from each other in the rearward direction of the second ship, and a straight line connecting ends of the pair of straight lines. The pair of straight lines drawn rearward indicate the longitudinal waves and the straight line connecting the ends indicates the transverse wave.

Figure 6:
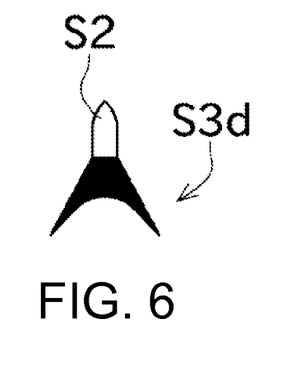
FIG. 6 is a view illustrating a display mode of the ship waves in a fourth modification.

A ship wave S3d of the fourth modification illustrated in FIG. 6 is a modification of the third modification (FIG. 5) and the part corresponding to the transverse wave is expressed by a curve line instead of the straight line.

Although the plurality of modifications in displaying the ship waves are described above, in addition to the above examples, various display modes can be considered for the ship waves on the display unit. For example, the ship waves may be displayed as an oblong rectangle.

Although the preferred embodiment of this disclosure and the modifications thereof are described, the above configurations may further be modified as follows.

In the above embodiment and modifications, the ship wave processing module 23 estimates the ship waves of the second ship based on the AIS information received from the second ship. In the case of estimating the ship waves based on the information received from the second ship as above, ship waves caused by a second ship located far from the first ship can also surely be detected, which is advantageous in that the user can monitor the ship waves in a wide range and promptly make an action. Note that, the method of estimating the ship waves of the second ship is not limited to this. For example, if the radar apparatus has the Target Tracking (TT) function, position and speed of a target object (target), such as a second ship located in the vicinity of the first ship, can be detected based on transition of the radar image. Further, a size of the second ship can be estimated to some extent based on the size of the radar echo corresponding to the second ship. Therefore, the ship wave processing module 23 may estimate the ship waves of the target object tracked with the TT function, and the ship waves may be displayed on the display unit 30.

In the above embodiment and modifications, the ship wave processing module 23 may detect the ship waves by analyzing unevenness of the water surface based on the information of the radar image received from the radar antenna 11, and the detected ship waves may be graphically displayed on the display unit 30. Further, the ship waves in the vicinity of the first ship may be acquired by other than the radar antenna 11, for example, the ship waves may be detected by a camera provided in the first ship and configured to capture the water surface. By displaying the ship waves detected with an instrument provided in the first ship as described above, even in a case where the information from the second ship cannot be acquired for some reason, the ship wave S3 can be displayed on the display unit 30 without any problem.

In the above embodiment and modifications, the AIS transceiver 12 performs both transmission and reception of the AIS information. However, it may be such that the AIS transceiver 12 only has a function to receive the AIS information and does not transmit the AIS information.

In the above embodiment and modifications, the bypass-course indicating module 25 causes the display unit 30 to display the bypass course S5. However, without limiting to this, the bypass-course indicating module 25 may cause the display unit 30 to display a traveling direction of the first ship to avoid the risky ship wave S3. Moreover, instead of displaying the bypass course S5, a message, such as "immediately turn left by 90°," may be displayed on the display unit 30 to indicate a countermeasure against the ship waves to the user.

In addition to the ship waves caused by the second ship, the ship waves caused by the first ship may be displayed on the display unit 30. According to this configuration, the user can be prompted to steer the first ship in a manner that the influence given to the vicinity of the first ship from the ship waves caused by the first ship can be reduced, for example, in a case where a fishing boat in operation is located in the vicinity of the first ship.

In the above embodiment and modifications, the ship wave S3 detected or estimated by the ship wave processing module 23 is displayed on the display unit 30; however, without limiting to this, the graphic shape of the ship wave S3 may simply and uniformly be drawn rearward of the second-ship symbol S2. Also with this configuration, it can be expected that the user notices the existence of the ship waves caused by the second ship and makes a suitable action.

In the radar apparatus 1 of the above embodiment and modifications, a high wave which is caused by waves from multiple directions overlapping with each other may be considered as a pyramidal wave and displayed on the display unit 30.

The application of this disclosure is not limited to the radar indicator 2 as described in the above embodiment and the like, and may also be applied to a plotter device configured to display a chart image indicating a situation in the vicinity of the first ship, and the position of the second ship acquired from the AIS information such that the position of the second ship is superimposed on the chart image.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A ship vicinity information display device, comprising:
    processing circuitry of a controller configured to:
        acquire information of a second ship existing in a vicinity of a first ship;
        generate information of a trail of disturbed water caused by the second ship; and
        cause a display device to graphically display the second ship, and the information of the trail, depicting the trail as a diverging pair of lines.

2. The ship vicinity information display device of claim 1, wherein the processing circuitry causes the display device to draw the second ship and the information of the trail, the information of the trail drawn as the pair of lines spreading away from each other in a rearward direction of the second ship.

3. The ship vicinity information display device of claim 1, wherein the processing circuitry generates the information of the trail by a calculation based on at least one of a moving speed, draft and size of the second ship.

4. The ship vicinity information display device of claim 1, wherein the processing circuitry generates the information of the trail based on information received from the second ship.

5. The ship vicinity information display device of claim 1, wherein the processing circuitry generates the information of the trail based on information detected by an instrument provided in the first ship.

6. The ship vicinity information display device of claim 1,
    wherein the processing circuitry evaluates a risk of encountering at least one of the trail at least based on the information of the trail, and
    wherein the processing circuitry causes the display device to display the risk on the display device.

7. The ship vicinity information display device of claim 6, further comprising an alarm device configured to issue an alarm when the risk of encountering the trail is evaluated as high by the processing circuitry.

8. The ship vicinity information display device of claim 1, wherein the processing circuitry causes the display device to display a change of the information of the trail over time on the display device in real time.

9. The ship vicinity information display device of claim 1, wherein the processing circuitry is further configured to indicate a countermeasure against the trail based on the information of the trail.

10. The ship vicinity information display device of claim 1, further comprising a trail information transmitter configured to transmit, to the second ship, information of trail caused by the first ship.

11. A method of displaying ship vicinity information on a ship vicinity information display device with processing circuitry of a controller, the processing circuitry executing the method comprising:
   acquiring information of a second ship existing in a vicinity of a first ship;
   generating information of a trail of disturbed water caused by the second ship; and
   causing a display device to graphically display the second ship and the information of the trail, depicting the trail as a diverging pair of lines.

* * * * *